(12) United States Patent
Khan et al.

(10) Patent No.: US 9,167,008 B2
(45) Date of Patent: Oct. 20, 2015

(54) TRAFFIC ROUTING ACROSS AND BETWEEN NETWORKS

(75) Inventors: David Khan, Johanneshov (SE); Anders Baer, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 173 days.

(21) Appl. No.: 13/990,142

(22) PCT Filed: Dec. 10, 2010

(86) PCT No.: PCT/EP2010/069405
§ 371 (c)(1),
(2), (4) Date: May 29, 2013

(87) PCT Pub. No.: WO2012/076065
PCT Pub. Date: Jun. 14, 2012

(65) Prior Publication Data
US 2013/0250942 A1    Sep. 26, 2013

(51) Int. Cl.
*H04L 12/66* (2006.01)
*H04L 29/06* (2006.01)
*H04L 29/08* (2006.01)

(52) U.S. Cl.
CPC ........ *H04L 65/1073* (2013.01); *H04L 65/1069* (2013.01); *H04L 67/2861* (2013.01); *H04L 65/1016* (2013.01); *H04L 65/80* (2013.01)

(58) Field of Classification Search
CPC ............ H04L 65/1073; H04L 65/1069; H04L 65/1016; H04L 67/2861
USPC ........................................................ 370/352
See application file for complete search history.

(56) References Cited

U.S. PATENT DOCUMENTS

| 6,049,712 | A  | * | 4/2000  | Wallinder ...................... 455/410 |
| 6,564,261 | B1 | * | 5/2003  | Gudjonsson et al. ......... 709/227 |
| 2004/0137900 | A1 | * | 7/2004  | Varonen et al. ............... 455/433 |
| 2007/0121584 | A1 | * | 5/2007  | Qiu et al. ....................... 370/352 |
| 2008/0112395 | A1 | * | 5/2008  | Zhu et al. ....................... 370/352 |
| 2008/0311888 | A1 | * | 12/2008 | Ku et al. .................... 455/414.1 |
| 2009/0024870 | A1 |   | 1/2009  | Pressley et al. |
| 2009/0156213 | A1 | * | 6/2009  | Spinelli et al. ................ 455/436 |
| 2009/0215453 | A1 | * | 8/2009  | Blanco Blanco et al. .. 455/435.1 |
| 2010/0216458 | A1 | * | 8/2010  | Cai et al. ..................... 455/432.3 |
| 2010/0233991 | A1 |   | 9/2010  | Crawford et al. |
| 2011/0103372 | A1 | * | 5/2011  | Shatsky et al. ................ 370/352 |
| 2011/0134843 | A1 | * | 6/2011  | Noldus et al. ................. 370/328 |
| 2011/0202956 | A1 | * | 8/2011  | Connelly et al. ................ 725/38 |
| 2012/0084342 | A1 | * | 4/2012  | Brown et al. ................. 709/203 |

FOREIGN PATENT DOCUMENTS

WO    2009149732 A1    12/2009

\* cited by examiner

*Primary Examiner* — Khaled Kassim
*Assistant Examiner* — Syed S Ali
(74) *Attorney, Agent, or Firm* — Coats & Bennett, P.L.L.C.

(57) ABSTRACT

A method of routing signalling plane traffic through or out of an IP Multimedia Subsystem, IMS, network. The method comprises maintaining within user profile data stored in a subscriber database of the IMS network, routing information defining signalling plane routing profiles for a user associated with the user profile data. Said routing information is transferred from the subscriber database to a Call Session Control Function, CSCF, of the IMS network at or following registration of said user to the IMS network. The method then comprises handling a Session Initiation Protocol, SIP, request for said user at the CSCF including adding said routing information into the request and forwarding the SIP request to a next hop node, and, at said next hop node or at a further downstream node, making a routing decision for the SIP request or for related signalling on the basis of the routing information contained within the SIP request.

15 Claims, 6 Drawing Sheets

TRAFFIC ROUTING ACROSS AND BETWEEN NETWORKS

TECHNICAL FIELD

The present invention relates to a method and apparatus for routing traffic across and between networks. More particularly, it relates to routing signalling traffic across an IP Multimedia Subsystem, IMS, network and/or from an IMS network to an external network via an interconnection gateway function.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Within an IMS network, Call Session Control Functions (CSCFs) perform session processing and routing of signalling. CSCFs handle session establishment, modification and release of IP multimedia sessions using the SIP/SDP protocol suite. 3GPP TS23.228 describes the logical nodes P-CSCF, I-CSCF, S-CSCF, E-CSCF and BGCF. The S-CSCF conforms to 3GPP TS 24.229 and performs session control services for User Equipments (UEs). It maintains session state to support the services, and performs the following functions:

It acts as a registrar according to [RFC3261] at registration;
It notifies subscribers about registration changes;
It provides session control for the registered users' sessions;
It handles SIP requests, and either services these internally or forwards them on to a further node; and
It interacts with IMS Application Servers.

The S-CSCF performs SIP routing according to 3GPP routing procedures. For inbound SIP traffic, the S-CSCF will route sessions to that P-CSCF whose address was stored during subscriber registration. For outbound SIP traffic, the S-CSCF interrogates a DNS/ENUM to determine how the call should be routed. The S-CSCF interacts with the Home Subscriber Server (HSS) to obtain subscriber data and to exchange authentication information using DIAMETER messages.

Figure 1:
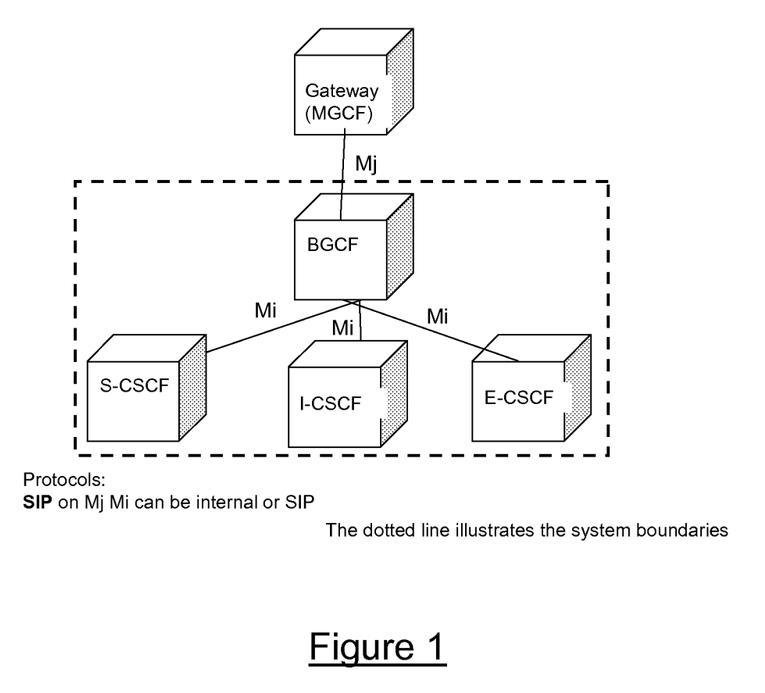
FIG. 1 illustrates schematically various nodes within and coupled to an IMS network.

The IMS allows IMS subscribers to initiate sessions towards non-IMS users, including users connected to conventional telephone networks. IMS subscribers may also be allocated addresses such as telephone numbers to allow for incoming calls to be made to these subscribers via external networks. This will result in increased usage of new multimedia services and therefore higher revenues for operators. The Breakout Gateway Control Function (BGCF) within an IMS network is used to select an outgoing gateway (by identifying a SIP URI and resolving that URI into an IP address) through which to route a SIP request addressed to an "external" destination address. The BGCF is specified in 3GPP TS23.228 and TS24.22. The outgoing gateway that is selected by the BGCF may be a Media Gateway Control Function, MGCF, which controls one or more Media Gateway lying in the media plane. FIG. 1 illustrates schematically a part of a network including a BGCF. Routing at the BGCF is based on, for example, calling party number, called party number, and configurable information in the BGCF. In addition, the selection of an external route can also be dependent on the routing number and/or Carrier Identification Code (CIC), or on other parameters if these other parameters are forwarded by the CSCF to the BGCF.

The BGCF may be collocated with a CSCF and invoked internally (or via an external interface) from the originating S-CSCF when there is no entry in the ENUM database for the destination telephone number and it is not otherwise possible to find an IP address for the telephone number. The BGCF is also invoked internally from the terminating I-CSCF when a location query against the HSS fails. The BGCF is also invoked internally from the E-CSCF when the target is a telephone number.

IMS standards further define an Interconnection Border Control Function (IBCF). The IBCF is used as gateway to communicate with other external networks. The IBCF handles border control for the SIP signaling interface, topology hiding and interworking with non-IMS networks. Typical functions are NAT and Firewall functions. The IBCF is in practice a Session Border Controller specialised for the NNI (Network To Network Interface).

According to existing and currently proposed IMS architectures there is no easy way to configure a BGCF or IBCF to perform different routing behaviour for specific users. If a specific user experiences a poor quality service and calls the network operator to complain, there is no easy way for the operator to control the behaviour for this specific user in the routing function. The routing tables are large and complex and the operator is likely to be unwilling to modify them for the sake of one individual user. Within the IMS signalling plane, routing of SIP signalling is similarly carried out according to block rules installed in signalling nodes such as the CSCFs. There is limited flexibility to implement routing procedures on a per user basis.

SUMMARY

According to a first aspect of the present invention there is provided a method of routing signalling plane traffic through or out of an IP Multimedia Subsystem, IMS, network. The method comprises maintaining within user profile data stored in a subscriber database of the IMS network, routing information defining signalling plane routing profiles for a user associated with the user profile data. Said routing information is transferred from the subscriber database to a Call Session Control Function, CSCF, of the IMS network at or following registration of said user to the IMS network. The method then comprises handling a Session Initiation Protocol, SIP, request for said user at the CSCF including adding said routing information into the request and forwarding the SIP request to a next hop node, and, at said next hop node or at a further downstream node, making a routing decision for the SIP request or for related signalling on the basis of the routing information contained within the SIP request.

At least some embodiments of the invention provide IMS network operators with the flexibility to implement routing on a per user basis. For example, if a particular user is experiencing poor service, an operator may be able to address this merely by updating the subscriber data in the HSS or other subscriber database.

According to a second aspect of the present invention there is provided apparatus configured to operate as a Call Session Control Function, CSCF, within an IP Multimedia Subsystem, IMS, network. The apparatus comprises an interface unit for receiving from a Home Subscriber Server of the IMS network, user profile data for a given user, the user profile data including routing information defining signalling plane routing profiles for said user, and a SIP request handler for including said routing information in a SIP request associated with said user and for forwarding the SIP request to a next hop node.

According to a third aspect of the present invention there is provided apparatus configured to operate as an interconnection control function for an IP Multimedia Subsystem, IMS, network, interconnecting at the signalling plane the IMS network to a plurality of external networks via a plurality of links. The apparatus comprises a memory for containing mappings between destination addresses and links to the external networks, the mappings including for at least some of said destination addresses a plurality of possible links, and a receiving unit for receiving a SIP request from an upstream node within said IMS network. The apparatus further comprises a router for downstream forwarding of signalling associated with said SIP request over one of said links, and a router controller for inspecting a received SIP request to identify both a destination address and user specific routing information defining signalling plane routing profiles for a user. The router controller further uses the destination address and the user specific routing information as a lookup to said memory to determine a forwarding link, and controls said router to forward said signalling via the determined forwarding link.

According to a fourth aspect of the present invention there is provided apparatus configured to forward a SIP request, received from an upstream IP Multimedia Subsystem, IMS, node, to a downstream IMS node. The apparatus comprises a first receiving unit for receiving a SIP request from said upstream IMS node, and a router for forwarding the SIP request to a first downstream IMS node. The apparatus further comprises a second receiving unit for receiving an error response reporting a failure at or en route to said first downstream node, and a router controller for reacting to receipt of said error response by identifying routing information contained within the SIP request, for selecting an alternative, second downstream IMS node based upon that information, and for controlling the router to forward said SIP request to said second downstream node.

DETAILED DESCRIPTION

As described above, there is a need for flexible user-based routing procedures within IP Multimedia Subsystem (IMS) networks. This need is addressed here by proposing the implementation of user-based routing profiles configured within the Home Subscriber Server (HSS) or other subscriber database, e.g. an evolved HSS. This could be a list of user profiles that can be used in a flexible way, with each entry in the list controlling a different kind of routing behaviour. The list of user profiles may be downloaded over the CX/DX interface into, and stored by, the selected S-CSCF at subscriber registration, together with currently provided user data (e.g. IFCs). The user routing profiles may be carried, for example, in the XML part of the user profile or as a separate new Attribute Value Pair (AVP) in the SAA message.

Figure 2:
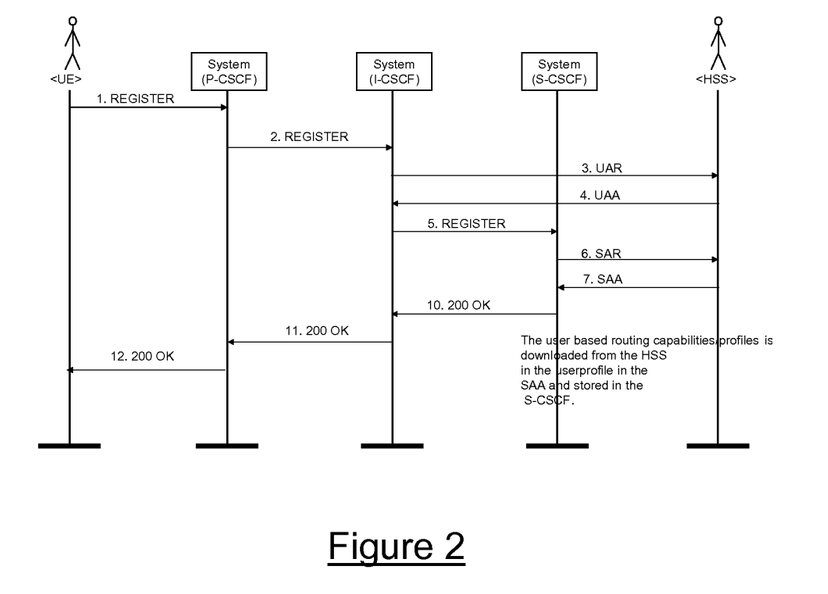
FIG. 2 illustrates signalling associated with a user IMS registration involving the transfer of user routing profiles from the HSS to the S-CSCF.

FIG. 2 shows signalling occurring at IMS subscriber registration, with the subscriber initiating the registration process by sending a SIP REGISTER request to the IMS network. In the illustrated example, the user routing profiles are provided to the S-CSCF as a separate AVP in the SAA message sent by the HSS.

When a call is made from a registered IMS subscriber, a SIP Request, e.g. SIP INVITE, will be sent from the subscriber's UE to the S-CSCF. When handling the request, the S-CSCF will add the stored routing profiles to the SIP Request. This could be done by adding a new SIP header in the SIP message that carries the routing profiles, or by including them in an existing SIP header or Request-URI. A routing function within the S-CSCF may make a routing decision based upon the routing profiles. In any case, an upstream routing function (e.g. CSCF, IBCF, BGCF) subsequently receiving the forwarded SIP Request can use the included routing profiles to make its own routing decision. Different profiles within this added information may, for example, be applicable to different routing functions within the IMS network, or may define behaviours in response to different situations.

By way of example, two particular use cases for the mechanism described above will now be considered. Both use cases relate to the control of different routing behaviours in a routing function when breaking out calls to an MGC/PSTN. These use cases are however only illustrative, and other use cases will be apparent to the skilled person.

Use Case 1:

Network operators would like to improve the connection success rate for calls involving interconnect traffic in the presence of congestion situations over the interconnect or in a peering or carrier network. Current solutions to this problem involve so-called "crankback" routing. Crankback involves selecting and trying an alternate route when a SIP error response indicating congestion (or some other reason for a signalling failure) is received in response to a message sent over a previously selected route.

When performing number-based routing, the IMS network operator may have the possibility to configure crankback routes and to specify which error responses will trigger crankback by configuring tables within a routing function. These tables are usually based on typical number analysis (e.g. per national or international dialling prefix) which means that crankback is applied at the level of a group of users and not on a per user level.

It is proposed here to provide, for the routing function, different routing tables corresponding to respective different subscriber profiles. Within a given table, routes are specified for different SIP error response codes. When receiving a SIP error response code, the routing function will select the correct routing table by analysing the content of the received SIP Request (e.g. looking into the message header to identify the profiles defined for the subscriber), and then look up the error response code in the table to identify an alternative route (or other procedure for handling the request, e.g. drop the call). Crankback re-routing can thus be triggered differently depending on the subscriber.

Figure 3:
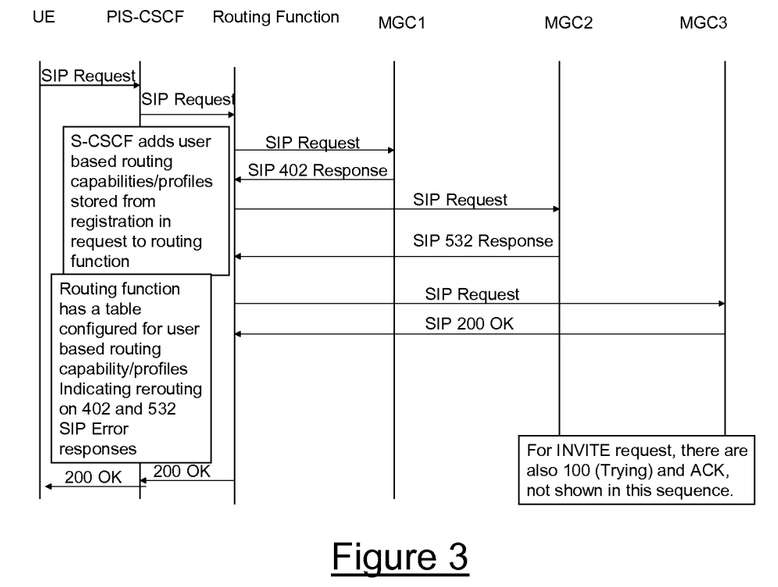
FIG. 3 shows signalling associated with the handling of a SIP Request at a routing function according to a first scenario.

FIG. 3 illustrates signalling associated with this process, where a SIP Request is forwarded to a routing function via one or more of a P-CSCF, I-CSCF, and S-CSCF. In this example, the routing function initially tries to route the request to a first MGC1, but receives in response a SIP error response (code 402). Based upon the user routing profiles contained in the SIP Request, the routing function identifies the appropriate routing table and looks up the 402 code. This specifies that the SIP Request should now be forwarded to MGC2. Again, an error response is returned, this time with a 532 code. Again, the routing functions looks up the identified table using this code, and determines that the Request should now be forwarded to MGC3. This time, the Request is successfully delivered and a SIP 200 OK is returned to the routing function, and forwarded on to the subscriber UE.

Figure 4:
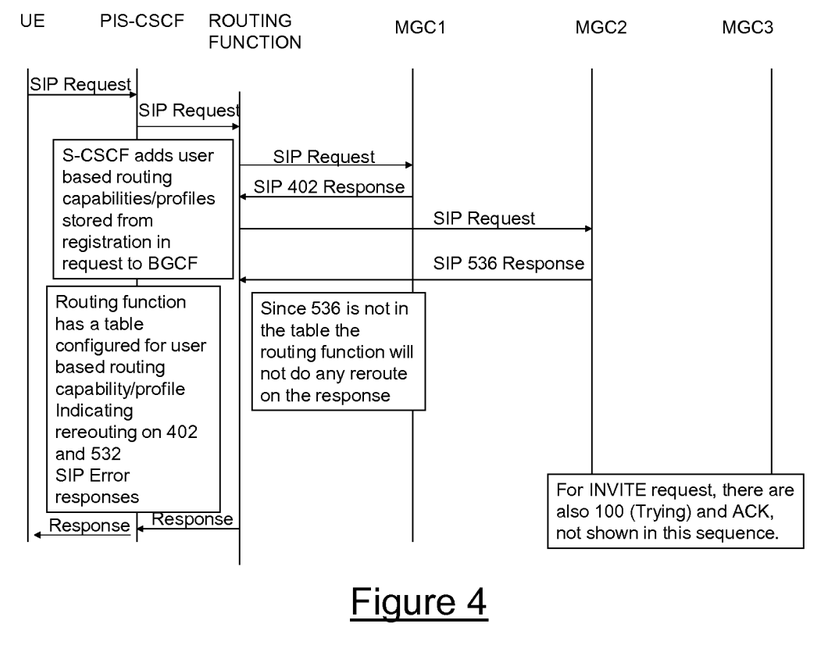
FIG. 4 shows signalling associated with the handling of a SIP Request at a routing function according to a second scenario.

FIG. 4 illustrates signalling associated with an alternative scenario, i.e. where MGC2 returns an error response code 536. In this case, the routing table selected for the subscriber has no entry for an error code 536. The routing function therefore makes no further attempt to re/route the SIP Request, and rather returns an error response to the subscriber.

Use Case 2:

Considering now interconnection routing performed at a routing function such as the Breakout Gateway Control Function, BGCF, the current selection of how and where to route a call is based on broad categories, e.g. calling party domain, calling party number, called party number, media type, and configurable information in the routing function, e.g. the BGCF. These categories do not allow fully unique user (e.g. per Public User ID) centric routing. In order to determine at the BGCF if a unique user in a telephone number range shall be routed to a distinct destination, some additional information is needed by the BGCF. Such information would allow the BGCF, for example, to always route the calls for a specific user to a path that has available capacity or has the shortest path (of the available paths).

Figure 5:
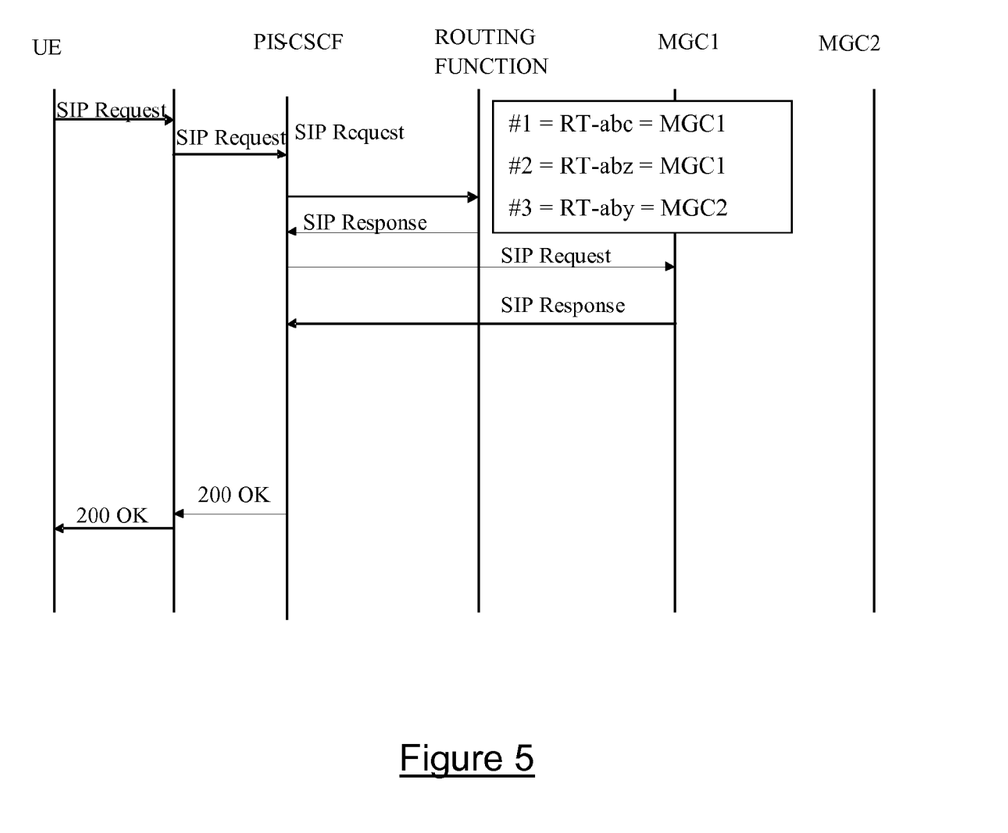
FIG. 5 shows signalling associated with the handling of a SIP Request at a routing function according to a third scenario.

With the approach described here, the BGCF is able to use the user-based routing profiles received in a SIP Request as an identifier to classify the subscriber when choosing which routing table to select when performing external network selection. The BGCF is able, for example, to select the appropriate routing table for a subscriber (premium, business, basic) to ensure that the subscriber receives a service appropriate to the level of his subscription. Different routing tables may provide routes with different numbers of hops to the destination, different geographic routes (e.g. based upon security criteria), different bandwidths carriers, different network technologies (e.g. IP or POTS), etc. Signalling associated with this SIP Request handling procedure is illustrated in FIG. 5, where a routing function, e.g. the BGCF, chooses between one of three routing tables (#1, #2, and #3) based on the user specific routing information contained in the SIP Request. The SIP Request is forwarded to a MGC appropriate for the routing decision.

Figure 6:
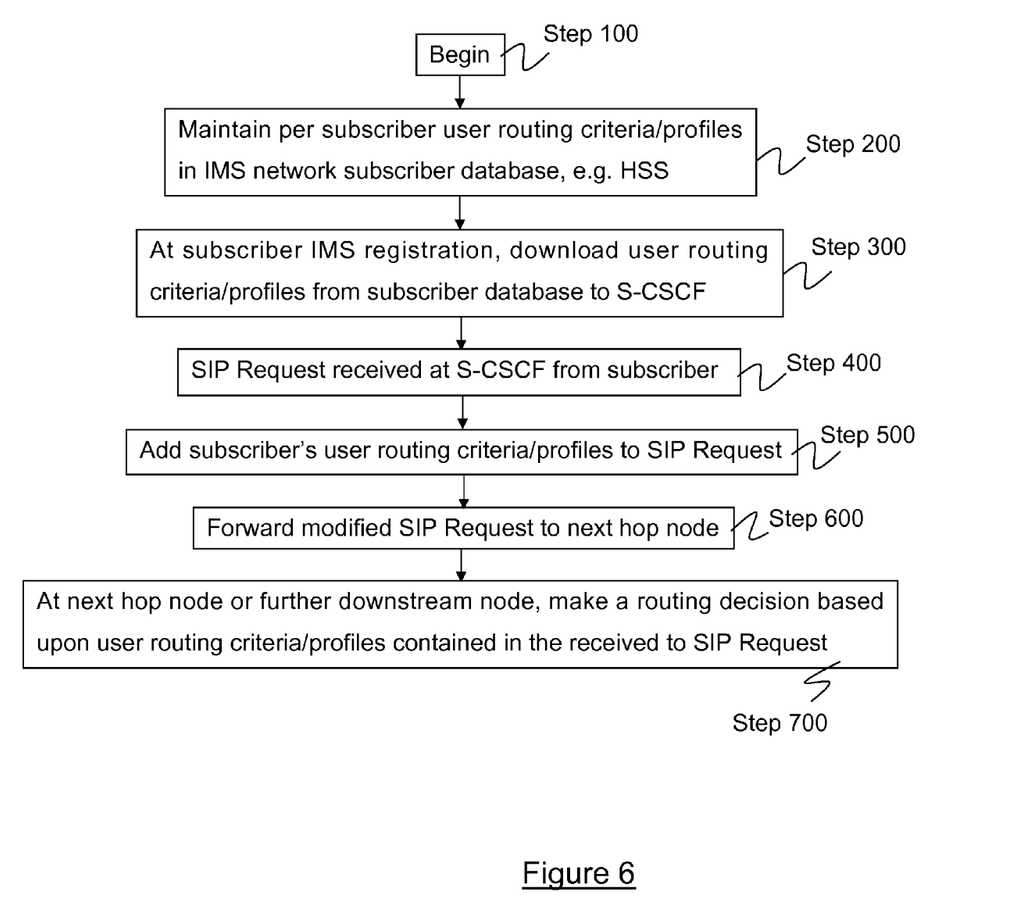
FIG. 6 is a flow diagram illustrating high level steps associated with the implementation of a flexible user-based routing procedure in the IMS.

FIG. 6 is a flow diagram illustrating a procedure for implementing user-based routing within and out of an IMS network. The procedure begins at step 100, and at step 200 and ongoing process of maintaining per subscriber routing profiles in a subscriber database is initiated. Typically, initial user profiles are installed into the HSS when the subscriber is first provisioned in the HSS. Of course, this data may be altered at any time, e.g. in response to a subscriber upgrading his or her subscription.

At step 300, a subscriber registers with the IMS network. This may occur when the subscriber turns on his or her UE. The allocated S-CSCF downloads subscriber data from the subscriber database including the recorded routing profiles. These are stored in the HSS for the duration of the subscriber's IMS registration. At step 400 the S-CSCF CSCF receives a SIP Request from the subscriber's UE, e.g. a SIP INVITE. At step 500 the S-CSCF receives the subscriber's routing profiles from memory and adds these to the SIP Request. At step 600 the modified SIP Request is forwarded to a next hop node according to some predefined route selection criterion.

At step 700, the SIP Request is received by the next hop node or some further downstream node in the IMS network. This receiving node makes a routing decision, or a re-routing decision, based inter alia on the routing profiles contained in the SIP Request.

Figure 7:
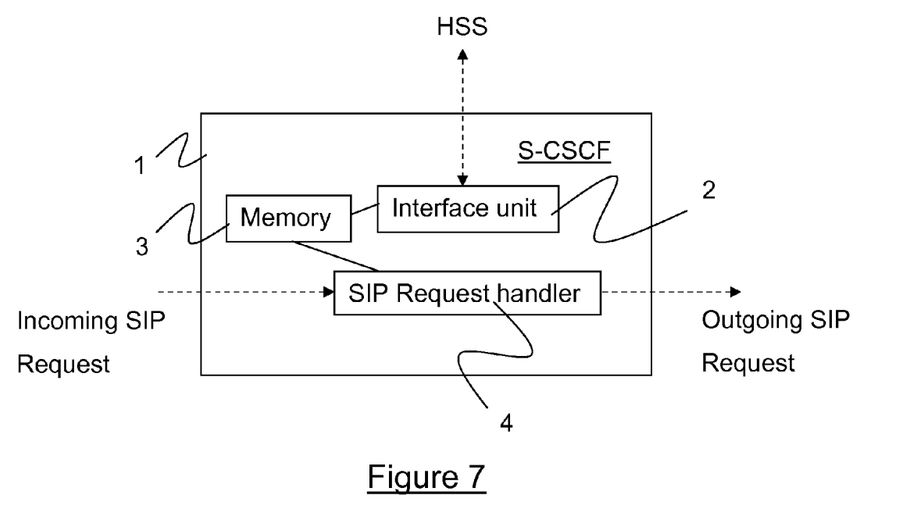
FIG. 7 illustrates schematically apparatus implementing an S-CSCF.

FIG. 7 illustrates schematically an S-CSCF that might be used in the procedure discussed above. The S-CSCF 1 comprises an interface unit 2 that is able to communicate with an HSS containing subscriber data. The interface unit 2 is able to request and receive subscriber data including the user routing profiles. User routing information received by the interface unit 2 is stored in a memory 3. A SIP Request handler is responsible for receiving and forwarding SIP Requests. The handler is configured to include user routing profiles information into SIP Requests and, optionally, to route requests based upon that information.

Figure 8:
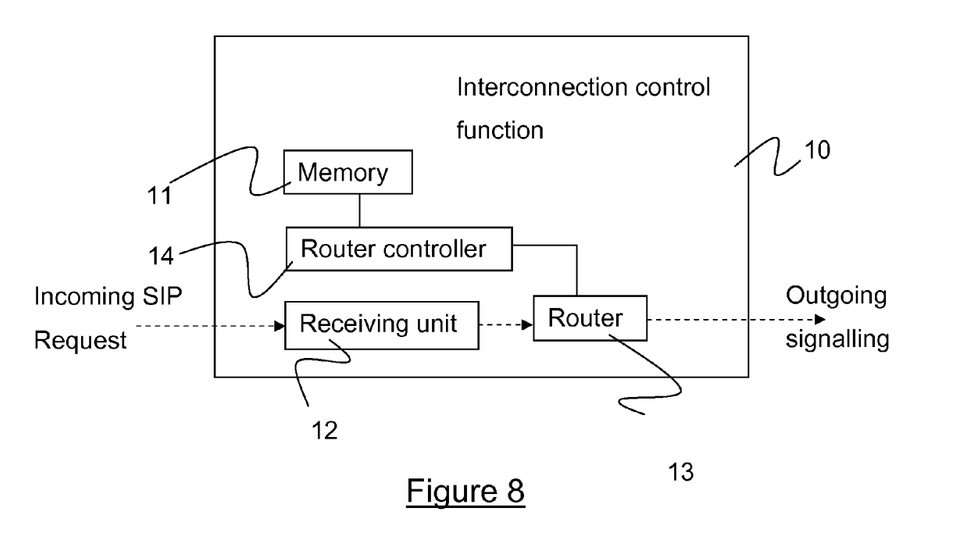
FIG. 8 illustrates schematically apparatus implementing an interconnection function.

FIG. 8 illustrates schematically an interconnection control function node 10 such as a BGCF. The node 10 includes a memory 11 containing mappings between destination addresses and links to external networks (e.g. PSTN, POTS etc), the mappings including for at least some of said destination addresses a plurality of possible links. A receiving unit 12 is configured to receive a SIP request from an upstream node within said IMS network, whilst a router 13 is provided for downstream forwarding of the SIP request over one of the outgoing links. A router controller 14 is provided for inspecting a received SIP request to identify both a destination address and user specific routing information defining signalling plane routing profiles for a user, for using the destination address and the user specific routing information as a lookup to said memory to determine a forwarding link, and for controlling said router to forward the SIP Request via the determined forwarding link.

Figure 9:
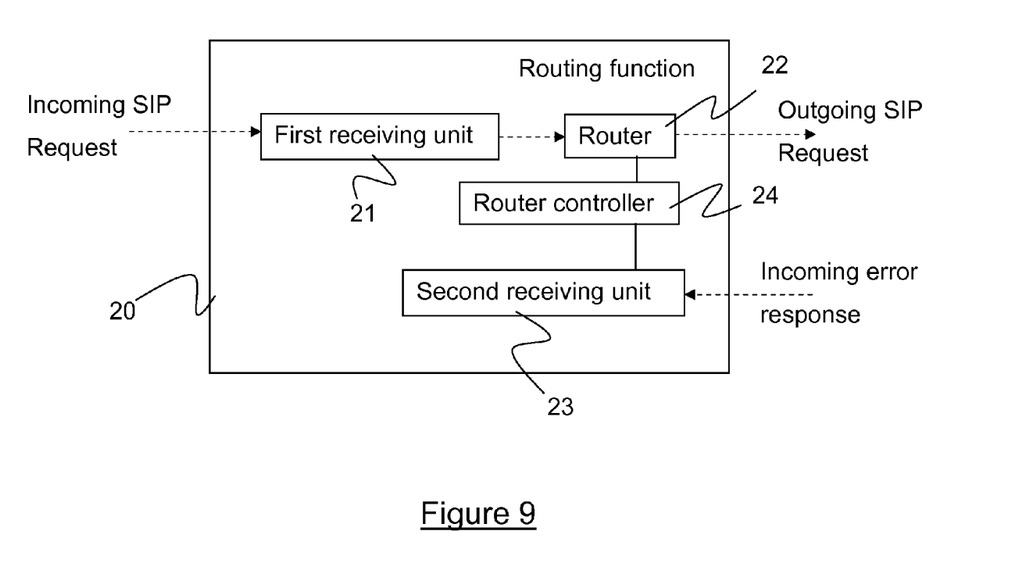
FIG. 9 illustrates schematically apparatus implementing a routing function.

FIG. 9 illustrates schematically a node 20 implementing a routing function for SIP Requests. The node comprises a first receiving unit 21 for receiving a SIP request from said upstream IMS node, and a router 22 for forwarding the SIP request to a first downstream IMS node. A second receiving unit 23 is provided for receiving an error response reporting a failure at or en route to that first downstream node. A router controller 24 is further provided for reacting to receipt of said error response by identifying routing information contained within the SIP request, for selecting an alternative, second downstream IMS node based upon that information, and for controlling the router 22 to forward said SIP request to said second downstream node.

It will be appreciated by the person of skill in the art that various modifications may be made to the above described embodiments without departing from the scope of the present invention.

The invention claimed is:

1. A method of routing signaling plane traffic through or out of an IP Multimedia Subsystem (IMS) network, the method comprising:
    configuring, for a user, a list of routing profiles within a subscriber database of the IMS network, each routing profile controlling a different kind of signaling plane routing behavior for the user;
    at or following registration of the user to the IMS network, transferring the routing profiles for the user from the subscriber database to a Call Session Control Function (CSCF) of the IMS network, wherein the CSCF is a Serving CSCF to which the user is allocated;
    handling a Session Initiation Protocol (SIP) request for the user at the CSCF including adding the routing profiles into the request and forwarding the SIP request to a next hop node, wherein the CSCF adds the routing profiles into the SIP request by including the routing profiles in a SIP header or Request Uniform Resource Identifier of the SIP request; and
    at the next hop node, or at a further downstream node, making a routing decision for the SIP request or for related signaling based on the routing profiles contained within the SIP request.

2. The method of claim 1, wherein the CSCF itself makes a routing decision for the SIP request based on the routing profiles.

3. The method of claim 1, wherein the routing profiles are transferred to the CSCF within an XML document or as a separate Attribute Value Pair.

4. The method of claim 1, further comprising, at the next hop node or further downstream node, making the routing decision in response to a SIP error response received at that node following an attempt to forward the SIP request.

5. The method of claim 4, wherein the routing decision is a decision to forward the SIP request via an alternative route.

6. The method of claim 1, wherein the next hop node or further downstream node is a Breakout Gateway Control Function interconnecting the IMS network to a plurality of external networks.

7. The method of claim 6, wherein the routing decision is a selection of one of the external networks to which to send the related signaling, or a selection of a link to a given network.

8. The method of claim 1, wherein the subscriber database is provided by a Home Subscriber Server.

9. An apparatus configured to operate as a Call Session Control Function (CSCF) within an IP Multimedia Subsystem (IMS) network, the apparatus comprising:
    an interface circuit configured to receive, from a Home Subscriber Server of the IMS network, user profile data for a given user, the user profile data including a plurality of routing profiles, each profile controlling a different kind of signaling plane routing behavior of the user;
    a Session Initiation Protocol (SIP) request handler circuit configured to:
        add the plurality of routing profiles to a SIP request associated with the user, wherein the apparatus adds the routing profiles into the SIP request by including the routing profiles in a SIP header or Request Uniform Resource Identifier of the SIP request; and
        forward the SIP request to a next hop node;
        wherein the apparatus configured to operate as a Serving CSCF to which the user is allocated.

10. The apparatus of claim 9, wherein the SIP request handler circuit is configured to add the plurality of routing profiles in a SIP header or Request Uniform Resource Identifier of the SIP request.

11. The apparatus of claim 10, wherein the SIP request handler circuit is configured to route the SIP request downstream based on the plurality of routing profiles.

12. An apparatus configured to operate as an interconnection control function for an IP Multimedia Subsystem (IMS) network; the apparatus interconnecting, at the signaling plane, the IMS network to a plurality of external networks via a plurality of link; the apparatus comprising:
    memory containing mappings between destination addresses and links to the external networks, the mappings including for at least some of the destination addresses a plurality of possible links;
    a receiving circuit configured to receive a Session Initiation Protocol (SIP) request from an upstream node within the IMS network, wherein the upstream node is a Serving Call Session Control Function (CSCF) to which a user is allocated;
    a router for downstream forwarding of signaling associated with the SIP request over one of the links;
    a router controller configured to:
        inspect a received SIP request to identify both a destination address and a plurality of routing profiles, each profile controlling a different kind of signaling plane routing behavior for the user, wherein the CSCF adds the routing profiles into the SIP request by including the routing profiles in a SIP header or Request Uniform Resource Identifier of the SIP request;
        use the destination address and the routing profiles as a lookup to the memory to determine a forwarding link; and
        control the router to forward the signaling via the determined forwarding link.

13. The apparatus of claim 12, wherein:
    the memory is configured to contain the mappings as a plurality of routing tables;
    the routing profiles act as an identifier of the specific routing table to be used to determine a forwarding link.

14. The apparatus of claim 13, wherein the routing tables are each associated with one or more of:
    a different quality of service;
    a different number or range of hops to a destination;
    a different geographical route;
    different bandwidth carriers;
    different network types.

15. The apparatus of claim 12, wherein the interconnection control function is one of a Breakout Gateway Control Function and an Interconnection Border Control Function.

\* \* \* \* \*